United States Patent
Umemoto et al.

(10) Patent No.: US 9,603,228 B2
(45) Date of Patent: Mar. 21, 2017

(54) DISCHARGE LAMP LIGHTING APPARATUS

(71) Applicant: Murata Manufacturing Co., Ltd., Nagaokakyo-shi, Kyoto-fu (JP)

(72) Inventors: Tsuyoshi Umemoto, Nagaokakyo (JP); Takafumi Toda, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 14/940,295

(22) Filed: Nov. 13, 2015

(65) Prior Publication Data

US 2016/0165704 A1 Jun. 9, 2016

(30) Foreign Application Priority Data

Dec. 9, 2014 (JP) .................... 2014-248545

(51) Int. Cl.
- *H05B 41/288* (2006.01)
- *H05B 41/292* (2006.01)
- *H05B 41/38* (2006.01)

(52) U.S. Cl.
CPC ..... *H05B 41/2887* (2013.01); *H05B 41/2928* (2013.01); *H05B 41/388* (2013.01); *Y02B 20/202* (2013.01); *Y02B 20/204* (2013.01)

(58) Field of Classification Search
CPC ............ H05B 41/2883; H05B 41/2886; H05B 41/2925; H05B 41/388; H05B 41/042
See application file for complete search history.

(56) References Cited

U.S. PATENT DOCUMENTS

2011/0025219 A1* 2/2011 Samejima .......... H05B 41/2883
315/246

FOREIGN PATENT DOCUMENTS

| JP | 4281362 B2 | 6/2009 |
| JP | 2011-029012 A | 2/2011 |

* cited by examiner

*Primary Examiner* — Alexander H Taningco
*Assistant Examiner* — Seokjin Kim
(74) *Attorney, Agent, or Firm* — Keating & Bennett, LLP

(57) ABSTRACT

A discharge lamp lighting apparatus includes an inverter circuit supplying an AC voltage to a discharge lamp and a resonant circuit that increases a supply voltage supplied to the discharge lamp. The inverter circuit is driven using a first frequency including a resonant frequency of the resonant circuit during a first period in which breakdown and a glow discharge are generated, driven using a second frequency including a resonant frequency of the resonant circuit, lower than the first frequency, during a second period in which an arc discharge is generated, and driven using a third frequency lower than the second frequency, during a third period. Further, a dead time is set in which both of a high-side switching device and a low-side switching device are turned off so that the dead time is longer in the second period than in the first period and the third period.

13 Claims, 9 Drawing Sheets

DISCHARGE LAMP LIGHTING APPARATUS

BACKGROUND OF THE INVENTION

1. Field of the Invention

The present invention relates to a discharge lamp lighting apparatus for lighting a discharge lamp, in particular, a high-luminance discharge lamp such as a high-pressure mercury lamp, a metal halide lamp, or a xenon lamp.

2. Description of the Related Art

In general, a discharge lamp reaches a steady state (steady lighting) through a "breakdown phase", a "glow discharge phase", and an "arc discharge phase". Examples of an apparatus performing such lighting control of a discharge lamp include an apparatus disclosed in Japanese Unexamined Patent Application Publication No. 2011-29012.

It is disclosed in Japanese Unexamined Patent Application Publication No. 2011-29012 that the following start-up sequence is effective to expedite the dissipation of the state of an asymmetrical discharge, thereby realizing reliable lighting in the "arc discharge phase" at the start-up time of the discharge lamp.

(1) First, at the time of initiating the start-up process of a discharge lamp, as a result of an inverter being driven at the third subharmonic frequency (fo/3) of the resonant frequency of a resonant circuit, a feeding circuit outputs a no-load open voltage.

(2) When the discharge lamp starts discharging due to dielectric breakdown, the driving frequency of the inverter is gradually decreased from the third subharmonic frequency (fo/3) of the resonant circuit to a predetermined threshold frequency.

(3) After the threshold frequency has been reached, the driving frequency of the inverter is switched to a stable-lighting frequency.

In the discharge lamp lighting apparatus described above, while the driving frequency of an inverter is decreased from fo/3 to a first threshold frequency, odd-order subharmonics such as fo/5 (fifth order subharmonic) and fo/7 (seventh order subharmonic) may be included. A resonant circuit connected to an inverter circuit generates a high voltage at such odd-order subharmonic frequencies and, hence, the state of a discharge lamp varies while the driving frequency of the inverter circuit is decreased from fo/3 to the first threshold frequency. For example, immediately after transition to an arc discharge state, the discharge state is not stable, depending on the state of a discharge material, before the whole discharge material sealed in the lamp is vaporized. When an arc discharge can no longer be maintained, the lamp has a tendency to return to a glow discharge state. However, when a voltage high sufficient to maintain the glow discharge state cannot be immediately supplied to the discharge lamp, a no-load state is entered, whereby "dying out" occurs. When such "dying out" occurs, a no-control state may be entered, and an overvoltage may be generated in the resonant circuit. This may result in the withstand voltage failure of the resonant circuit in the output stage, characteristics degradation due to the heat generation of switching devices in the inverter circuit, and a reduction in the lifetime of the discharge lamp due to damage.

SUMMARY OF THE INVENTION

Accordingly, preferred embodiments of the present invention provide a discharge lamp lighting apparatus that prevents degradation of a resonant circuit, an inverter circuit, and a discharge lamp, even when a no-load state is entered after initiating a discharge lamp start-up process.

According to preferred embodiments of the present invention, a discharge lamp lighting apparatus is preferably configured as follows.

A discharge lamp lighting apparatus according to a preferred embodiment of the present invention includes an inverter circuit that includes a high-side switching device and a low-side switching device and that generates an AC voltage supplied to a discharge lamp; an inverter control circuit that performs driving control of the inverter circuit; and a resonant circuit that includes a resonant inductor and a resonant capacitor, that is provided in a stage subsequent to the inverter circuit, and that increases, at a start-up time of the discharge lamp, a supply voltage supplied to the discharge lamp through a voltage step-up action accompanying a resonance phenomenon. The inverter control circuit includes a driving frequency control circuit that drives the inverter circuit by using a first frequency including a resonant frequency (fo/3) of the resonant circuit during a first period which is a period in which breakdown and a glow discharge subsequent to initiation of a start-up process of the discharge lamp are generated, that drives the inverter circuit by using a second frequency including a resonant frequency (e.g., fo/5) of the resonant circuit, the second frequency being lower than the first frequency, during a second period which is a period in which an arc discharge of the discharge lamp is generated, and that drives the inverter circuit by using a third frequency lower than the second frequency, during a third period subsequent to the second period; and a dead time control circuit that sets a dead time in which both of the high-side switching device and the low-side switching device of the inverter circuit are turned off so that the dead time is longer in the second period than in the first period and the third period.

With the configuration described above, even when no-control state is entered due to transition to a glow discharge state or a no-load state ("dying out") because an arc discharge state cannot be maintained, the resonant voltage of the resonant circuit is prevented from becoming an overvoltage, while securing an arc current required in the second period.

Preferably, the driving frequency control circuit gradually decreases a driving frequency of the inverter circuit from a start of the second period, and the dead time control circuit increases the dead time in accordance with a decrease in the driving frequency in the second period.

With the configuration described above, since the dead time is short right after the start of an arc discharge, a necessary arc current is secured. Hence, "dying out" right after transition from the first period to the second period is prevented. Further, the saturation phenomenon of the resonant inductor is significantly reduced or prevented since the peak value of the arc current is controlled by optimization of the dead time in a region in which the driving frequency is low or in a region in which the positive and negative portions of the waveform of the lamp current exhibit non-symmetry.

Preferably, the inverter control circuit includes a detector that detects a start of the arc discharge of the discharge lamp, and the driving frequency control circuit performs control of the first period until the start of the arc discharge is detected and switches to control of the second period after the arc discharge has been detected.

With the configuration described above, since switching to the second period is performed when the discharge lamp has actually started an arc discharge, transition from the first period to the second period is able to be made early, and the occurrence of "dying out" during the second period is significantly reduced or prevented.

According to preferred embodiments of the present invention, even when a no-control state is entered due to transition to a glow discharge state or a no-load state ("dying out") because an arc discharge state cannot be maintained, the resonant voltage of the resonant circuit is prevented from becoming an overvoltage, while securing an arc current required in the second period. Hence, the withstand voltage failure (dielectric breakdown) of the resonant circuit in the output stage, characteristics degradation due to the heat generation of the switching device in the inverter circuit, damage to the discharge lamp, and the like are prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
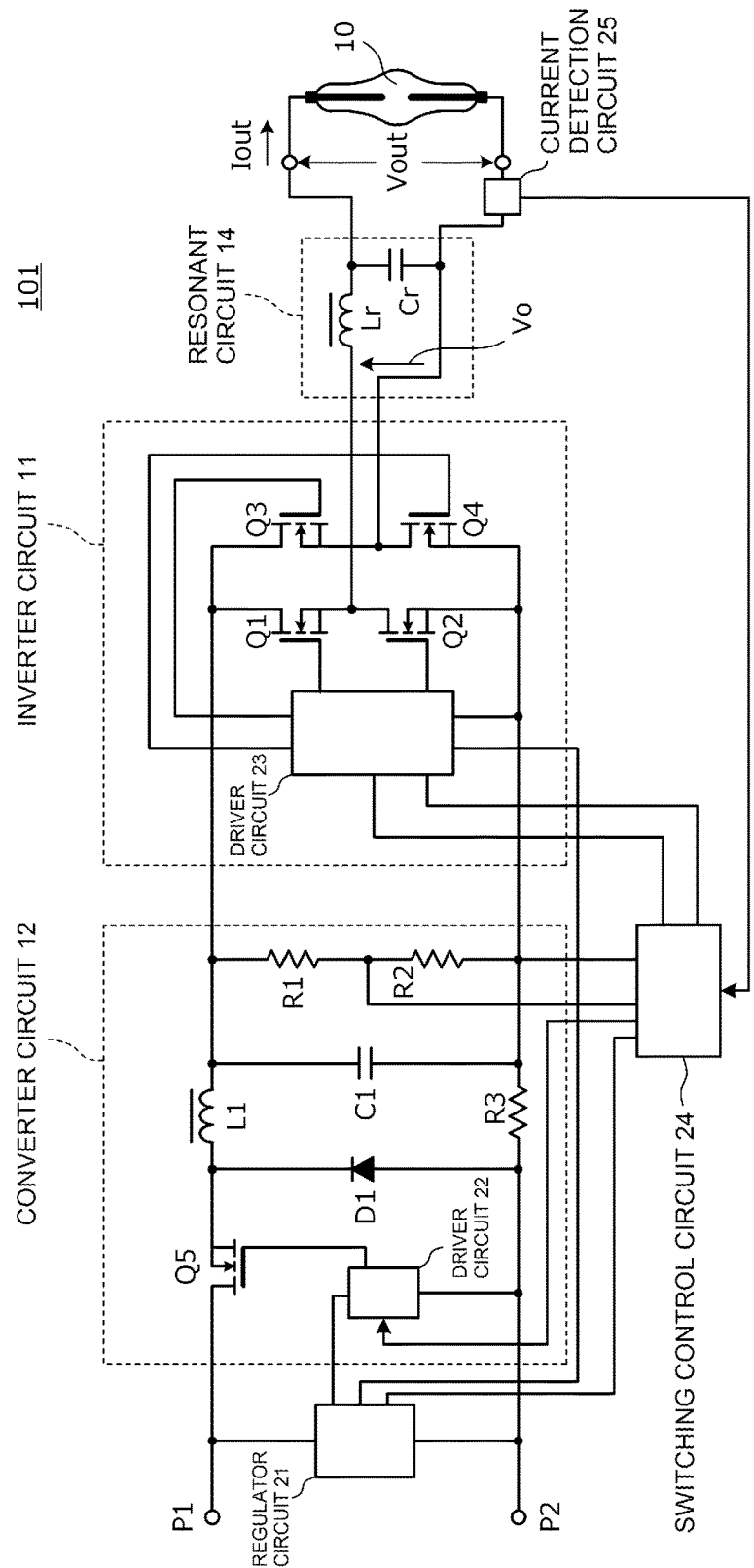
FIG. 1 is a circuit diagram of a discharge lamp lighting apparatus according to a first preferred embodiment of the present invention.

Hereinafter, a plurality of preferred embodiments of the present invention will be described by illustrating specific examples with reference to the drawings. Identical portions in the drawings are denoted by the same reference symbols. In the second and subsequent preferred embodiments, descriptions of portions common to the first preferred embodiment will be omitted and different portions will be described. In particular, similar operations and effects based on similar configurations will not be repeatedly described in every preferred embodiment.

First Preferred Embodiment

In the present preferred embodiment, a lighting apparatus for a discharge lamp is preferably used as a light source of, for example, a projector.

FIG. 1 is a circuit diagram of a discharge lamp lighting apparatus 101 according to a first preferred embodiment of the present invention. A discharge lamp 10 is a discharge lamp, such as a high-pressure mercury lamp, including a pair of main discharge electrodes. The discharge lamp lighting apparatus 101 includes an inverter circuit 11, a converter circuit 12, a resonant circuit 14, and a regulator circuit 21.

The inverter circuit 11 includes a driver circuit 23, high-side switching devices Q1 and Q3, and low-side switching devices Q2 and Q4, and applies an AC voltage to the discharge lamp 10 through the resonant circuit 14.

The converter circuit 12 converts a DC voltage input at input power supply terminals P1 and P2 into a predetermined DC voltage which is supplied to the inverter circuit 11.

The resonant circuit 14, which is a series resonant circuit including a resonant inductor Lr and a resonant capacitor Cr, is connected to the output stage of the inverter circuit 11 and increases a voltage supplied to the discharge lamp 10 through a step-up action accompanying a resonance phenomenon at the start-up time of the discharge lamp 10.

The regulator circuit 21 is connected to the input power supply terminals P1 and P2, and supplies predetermined power supply voltages respectively to a driver circuit 22 of the converter circuit 12, the driver circuit 23 of the inverter circuit 11, and a switching control circuit 24.

The converter circuit 12 is a step-down-chopper-type non-insulating converter circuit including a switching device Q5, a diode D1, an inductor L1, and a capacitor C1. The converter circuit 12 includes an output voltage/current detection circuit including resistors R1, R2, and R3.

The switching control circuit 24 preferably includes, for example, a digital signal processor (DSP). The switching control circuit 24 is an example of the "inverter control circuit". The switching control circuit 24, in the case of constant-voltage control of the converter circuit 12, compares the detection voltage of an output voltage detection circuit with an internal reference voltage, and performs on-duty control of the switching device Q5 such that the output voltage of the converter circuit 12 is maintained at a predetermined voltage. The switching control circuit 24, in the case of constant-current control of the converter circuit 12, compares a detection voltage proportional to an output current with an internal reference voltage, and performs on-duty control of the switching device Q5 such that an input current input to the inverter circuit 11 is maintained at a predetermined value.

The switching control circuit 24 causes the inverter circuit 11 generate an AC voltage having a predetermined frequency by switching control of the high-side switching devices Q1 and Q3 and the low-side switching devices Q2 and Q4 of the inverter circuit 11.

The driver circuit 23 of the inverter circuit 11 includes a high-side driving circuit that drives the high-side switching devices Q1 and Q3 and a low-side driving circuit that drives the low-side switching devices Q2 and Q4. The driver circuit 23 performs on/off switching of the switching devices Q1 and Q4 and on/off switching of the switching devices Q2 and Q3 in a complementary manner.

The switching control circuit 24 includes a driving frequency control circuit and a dead time control circuit. The switching control circuit 24 generates, for the driver circuit 23 of the inverter circuit 11, control signals for the high-side switching devices Q1 and Q3 and the low-side switching devices Q2 and Q4. The driver circuit 23 drives the switching devices Q1, Q2, Q3, and Q4 on the basis of the control signals described above generated from the switching control circuit 24.

A current detection circuit 25 that detects a lamp current is provided on the current path of the discharge lamp 10. The switching control circuit 24 performs control in accordance with the detection result of the current detection circuit 25. The control in accordance with the lamp current will be described later.

Figure 2:
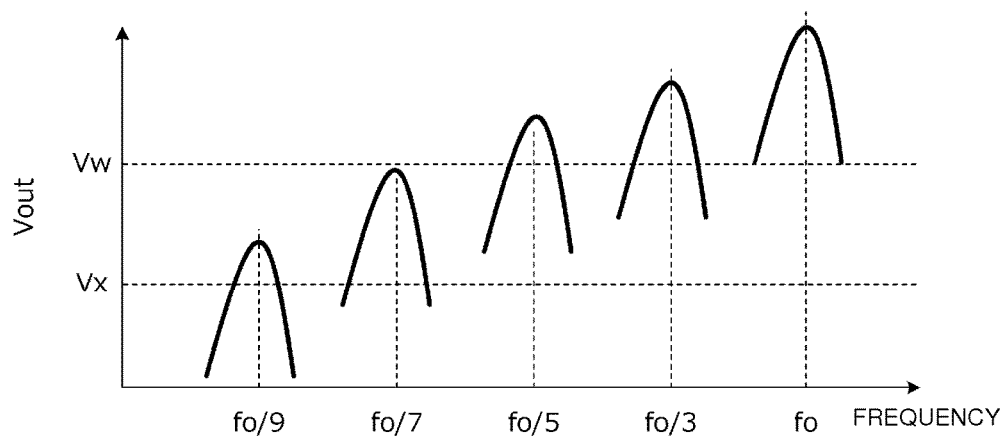
FIG. 2 is a diagram illustrating the relationship between the frequency of an AC voltage applied to a resonant circuit and an output voltage (resonant voltage across a resonant capacitor).

FIG. 2 is a diagram illustrating the relationship between the frequency of an AC voltage applied to the resonant circuit 14 and the output voltage (resonant voltage across the resonant capacitor Cr) Vout. The AC voltage waveform (substantially rectangular wave) output from the inverter circuit 11 can be expanded into a Fourier series, as generally represented by the following equation, and includes odd-order harmonic components (components whose frequencies are odd multiples of the fundamental-wave frequency).

Substantially rectangular wave=[inverter input voltage]×$4/\pi \times (\sin \omega t + \frac{1}{3} \sin 3\omega t + \frac{1}{5} \sin 5\omega t + \ldots)$ Here, duty=about 50%, $\omega = 2\pi f$ For example, when the inverter circuit 11 is driven at a frequency which is about ⅓ of the resonant frequency fo, the resonant circuit 14 resonates at the third harmonic component of the above equation and, hence, as the output voltage in a no-load state, a voltage of:

[the acuity Q of the resonance of the resonant circuit 14]×[the input voltage of the inverter circuit 11]×$(4/3)\pi$ is obtained. In this way, the output voltage Vout changes in accordance with the frequency of a substantially rectangular wave voltage applied to the LC circuit. As illustrated in FIG. 2, when a substantially rectangular wave with the resonant frequency fo of the resonant circuit 14 is applied, the output voltage Vout becomes the highest. At frequencies lower than the resonant frequency fo, resonance is generated at odd-order subharmonics (fo/(2n+1) [n: integer larger than or equal to 1]). The lower the frequency of the odd-order subharmonics, the lower the output voltage (resonant voltage) Vout. In the example illustrated in FIG. 2, at the resonant frequencies fo, fo/3, and fo/5, the resonant voltage Vout exceeds a withstand upper limit voltage Vw of the resonant circuit 14. As will be described later, by sweeping or switching the driving frequency of the inverter circuit 11, the discharge lamp 10 is lit stably under control performed such that the withstand upper limit voltage Vw is not exceeded. As a result, the withstand voltage failure of the resonant circuit 14 is avoided.

A voltage Vx represents a threshold below which there is no effect of degradation of characteristics due to the heat generation of the switching devices of the inverter circuit or a decrease in the lifetime of the discharge lamp due to damage, even when the resonant voltage of the resonant circuit enters a no-control state because an arc discharge state cannot be continued and a glow discharge state or a no-load state is entered, resulting in a no-control state.

Figure 3:
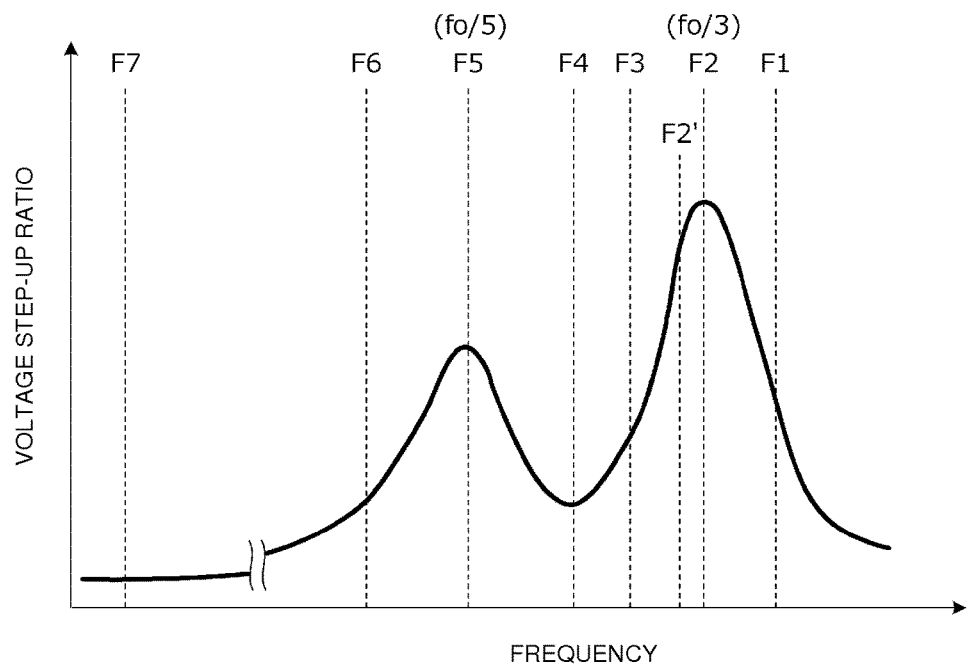
FIG. 3 is a diagram illustrating the relationship between the frequency of the resonant circuit and a voltage step-up ratio in a no-load state.

FIG. 3 is a diagram illustrating the relationship between the frequency of the resonant circuit 14 and a voltage step-up ratio in a no-load state. Since the relationship between the frequency and the resonant voltage of the resonant circuit 14 has the characteristics illustrated in FIG. 2, when the driving frequency of the inverter circuit 11 is swept in a range including about fo/3 and fo/5, the voltage step-up ratio in a no-load state becomes high when the driving frequency is about fo/3 or fo/5. In FIG. 3, frequencies F1 to F7 are the seven-step driving frequencies of the inverter circuit 11. The frequency F2 corresponds to about fo/3, and the frequency F5 corresponds to about fo/5. A frequency F2' corresponds to a frequency which is a little lower than about fo/3. For example, the resonant frequency is several hundred kilohertz, and F8 is several hundred hertz.

Figure 4:
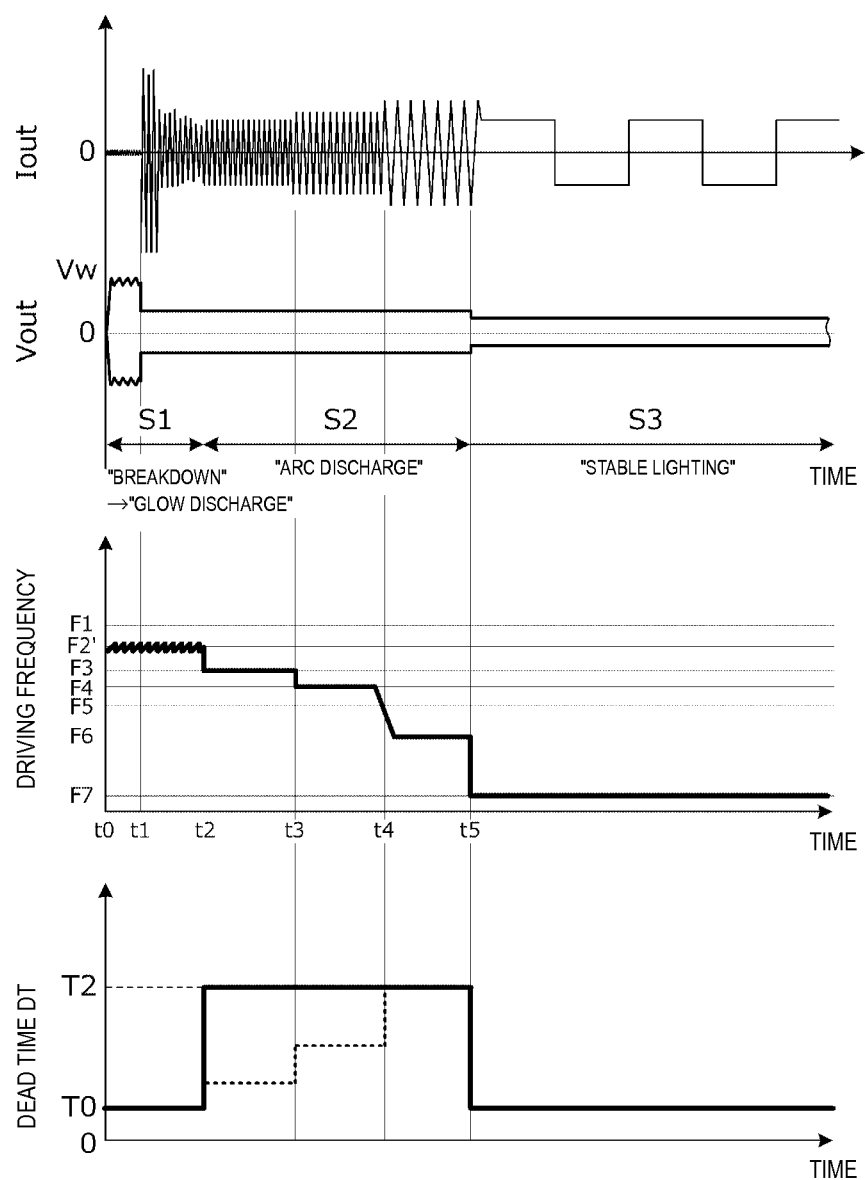
FIG. 4 illustrates the waveform diagrams of respective portions of the discharge lamp lighting apparatus illustrated in FIG. 1.

FIG. 4 illustrates the waveform diagrams of the respective portions of the discharge lamp lighting apparatus 101 illustrated in FIG. 1. Waveforms illustrated here are the waveform of an output current Iout flowing through the discharge lamp 10, the waveform of the output voltage Vout, the waveform illustrating the stepwise change of the driving frequency of the inverter circuit 11, and the waveform illustrating the stepwise change of a dead time DT in which the high-side switching devices and low-side switching devices of the inverter circuit 11 are both turned off. In FIG. 4, the envelope of the output voltage Vout is illustrated.

First, the start-up process of the discharge lamp 10 is initiated at time t0. In a first period S1, the discharge lamp 10 enters a breakdown state and starts a glow discharge. In a second period S2, the discharge lamp 10 starts an arc discharge, and in a third period S3, the discharge lamp 10 enters a stable-lighting state.

The behavior of the discharge lamp 10 after start-up initiation is as follows.

(1) Start-Up

As a result of a voltage higher than or equal to the glow discharge voltage being applied to the discharge lamp 10, dielectric breakdown is generated between discharge electrodes and a breakdown state is entered.

(2) Glow Discharge

Positive ions (e.g., Ar+, Hg+) in the discharge gas are accelerated by an electric field due to a high voltage between the electrodes and collide with the cathode, causing electrons to be kicked out, such that electron emission is maintained. The collision energy of these positive ions causes the cathode to be heated, causes the temperature of the discharge electrodes to be increased, and causes thermal electrons to be emitted, such that transition to an arc discharge takes place.

(3) Arc Discharge

Electron emission from the cathode is maintained in a state in which the cathode temperature is sufficiently high. Hence, the electron emission is able to be maintained by a relatively low voltage. In the case of a rare-gas discharge lamp, such as a mercury lamp, strong light radiation is instantly started with the start of an arc discharge.

The detailed sequence from the initiation of a start-up process to stable lighting is as follows.

[Time t0-t1]

At time t0, the output voltage of the converter circuit 12 is subjected to constant-voltage control so as to become a constant voltage of, for example, several kilovolts, and the driving frequency of the inverter circuit 11 is made to be minutely changed within a predetermined frequency range with a frequency F2' as the center. This allows a high voltage in proportion to the high voltage step-up ratio of the resonant circuit 14 to be applied to the discharge lamp 10 at a frequency near fo/3. Note that the output voltage Vout does not exceed the withstand upper limit voltage Vw of the resonant circuit 14.

The above-described predetermined frequency range with the frequency F2' as the center is an example of the "first frequency".

[Time t1-t2]

When the discharge lamp 10 enters a breakdown state, the output current Iout starts to flow as a result of a glow discharge being started. After this, this state is maintained for a period of time required before transition to an arc discharge is finished.

[Time t2-t5]

At time t2, transition to the second period S2 takes place. At time t2, the output voltage of the converter circuit 12 is subjected to constant-voltage control so as to become a constant voltage of, for example, several hundred volts, and the driving frequency of the inverter circuit 11 is switched to F3. In the example illustrated in FIG. 4, transition from a glow discharge to an arc discharge takes place at time t2.

At time t3, the driving frequency of the inverter circuit 11 is switched to F4. In accordance with a decrease in the driving frequency, the impedance of the inductor included in the resonant circuit 14 decreases and, hence, the lamp current increases.

At time t4, the driving frequency of the inverter circuit 11 is switched to F6. In accordance with a decrease in the driving frequency, the impedance of the inductor included in the resonant circuit 14 decreases and, hence, the lamp current further increases.

During the second period S2, the dead time (period during which the high-side switching devices Q1 and Q3 and the low-side switching devices Q2 and Q4 are turned off together) DT of the inverter circuit 11 is increased from T0 to T2. Hence, as described below, even when the arc discharge is interrupted ("dying out") during the second period S2, the output voltage of the resonant circuit 14 does not become excessively high.

Originally, the dead time DT is set so as to prevent an excessively high through current flowing from the high-side switching devices (Q1, Q3) to the low-side switching devices (Q2, Q4). However, in various preferred embodiments of the present invention, the dead time DT is set, as described above, in order not only to prevent the through current but also to significantly reduce or prevent a voltage generated at the no-load time.

The above-described frequencies F3-F6 are examples of the "second frequency".

[Time t5 and Later]

At time t5, transition to a third period S3 takes place. At time t5 and later, the output current of the converter circuit 12 is subjected to constant-current control so as to become a constant current corresponding to a predetermined stable arc discharge current, and at the same time, the driving frequency of the inverter circuit 11 is switched to F7. The output voltage Vout at this time is approximately in a range from ten volts to several tens of volts, for example.

In accordance with the stabilization of the discharge state of the discharge lamp 10, the target current level in the constant-current control described above is gradually increased. At the time when this target current level has reached the final level, the discharge lamp 10 reaches a "stable lighting" state.

The frequency F7 described above is an example of the "third frequency".

Figure 5:
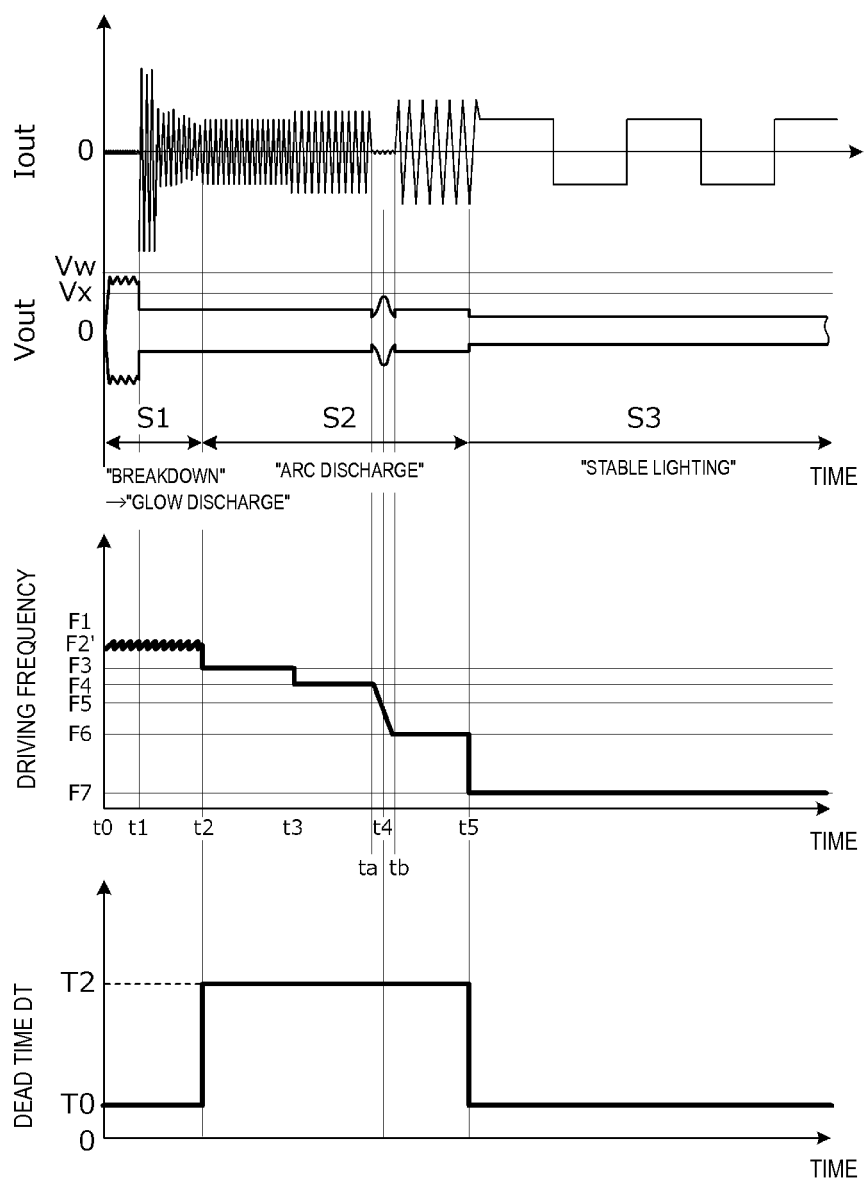
FIG. 5 illustrates the waveform diagrams of respective portions of the discharge lamp lighting apparatus at the time when "dying out" occurs during a second period.
Figure 12:
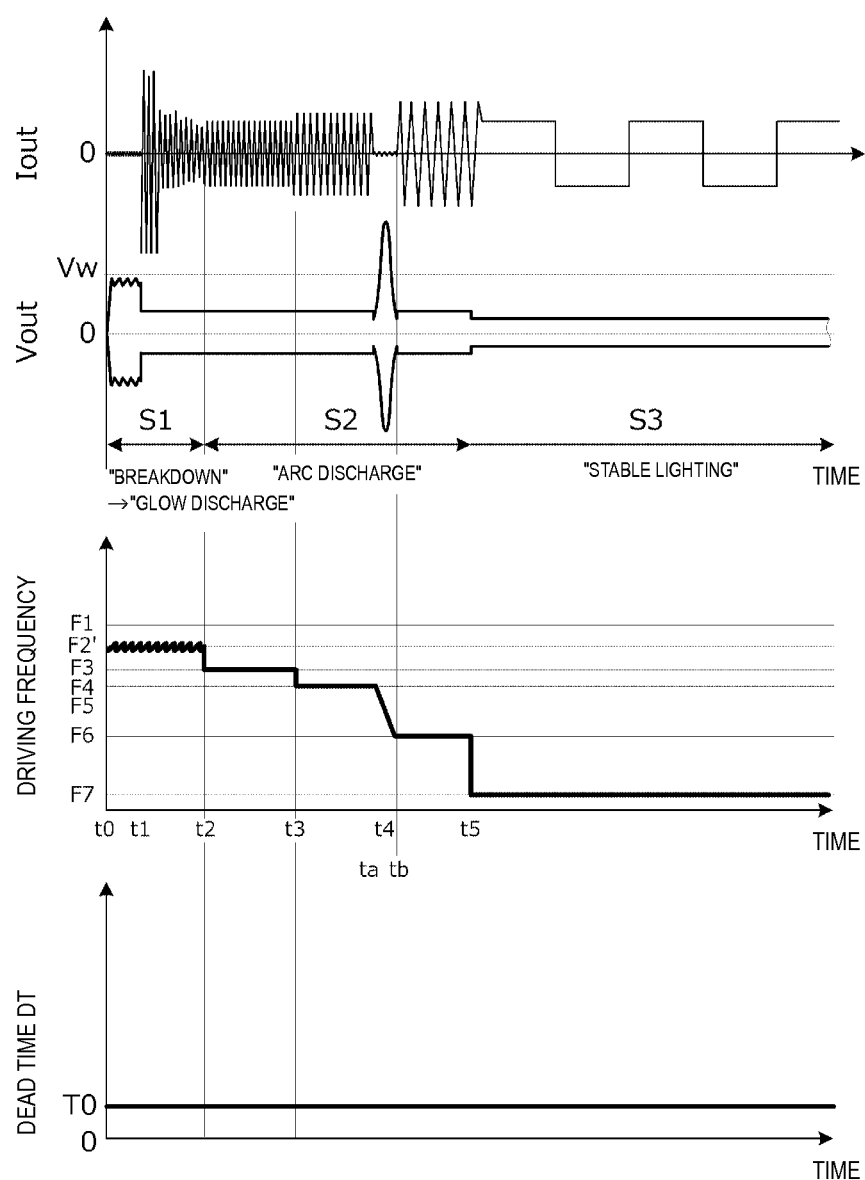
FIG. 12 illustrates waveform diagrams of respective portions of a discharge lamp lighting apparatus serving as a comparative example.

Next, the operation of the discharge lamp lighting apparatus 101 at the time when "dying out" occurs during the second period S2 will be described with reference to FIG. 5 and FIG. 12. FIG. 5 illustrates waveform diagrams of respective portions of the discharge lamp lighting apparatus of the present preferred embodiment, and FIG. 12 illustrates waveform diagrams of respective portions of a discharge lamp lighting apparatus serving as a comparative example. The discharge lamp lighting apparatus of this comparative example does not perform control of the dead time DT.

In the case where the current supplied to a discharge lamp becomes lower than the arc discharge maintaining current even for a short period, the arc discharge cannot be maintained and the discharge lamp will "die out". During the second period S2 during which the driving frequency of an inverter circuit is switched between several steps, a no-load state is entered when the discharge lamp "dies out". When the driving frequency at this time is the resonant frequency of the resonant circuit or near this frequency, the output voltage Vout becomes excessively high.

In the case where control of the dead time DT is not performed, in FIG. 12, when "dying out" is generated during a time period ta-tb where the driving frequency is near the frequency F5 (fo/5), since the voltage step-up ratio of the resonant circuit 14 at the time when the driving frequency is near the frequency F5 (fo/5) is high, the output voltage Vout becomes excessively high. As in the example illustrated in FIG. 12, when the output voltage Vout exceeds the withstand upper limit voltage Vw of the resonant circuit 14, in particular, degradation of the withstand voltage of the resonant capacitor Cr, or characteristics degradation due to the heat generation of the switching devices Q1 to Q4 of the inverter circuit 11 may be generated.

Compared with this, in the present preferred embodiment, as illustrated in FIG. 5, even when an arc discharge is interrupted during a time period ta-tb, "dying out" occurs, and a no-load state is entered, the output voltage Vout does not become excessively high since the dead time DT is long during the second period S2. Hence, as a result of the withstand upper limit of the resonant circuit 14 being not exceeded, in particular, degradation of the withstand voltage of the resonant capacitor Cr or degradation of characteristics due to the heat generation of the switching devices Q1 to Q4 of the inverter circuit 11 is prevented. Further, application of an overvoltage to the discharge lamp 10 is prevented and hence, damage to the discharge lamp 10 and a decrease in the lifetime of the discharge lamp 10 is prevented.

Note that, regarding the waveform of the dead time DT in FIG. 4, the dead time DT may be increased stepwise in accordance with a stepwise decrease in the driving frequency from time t2 to time t5, as illustrated by a dotted line. This stepwise switching of the driving frequency is an example of "control for gradually decreasing a driving frequency".

As a result of this, a necessary arc current is secured. Hence, "dying out" in which transition to a glow discharge state or a no-load state takes place because an arc discharge state cannot be continued is prevented. Further, since the resonant voltage of a resonant circuit is decreased, even when there is a positive or negative deviation in an arc current, it becomes easy to significantly reduce or prevent the saturation phenomenon of a resonant inductor while limiting an excessively high voltage at no-load time. The positive and negative deviation in the arc current will be described later.

Figure 6:
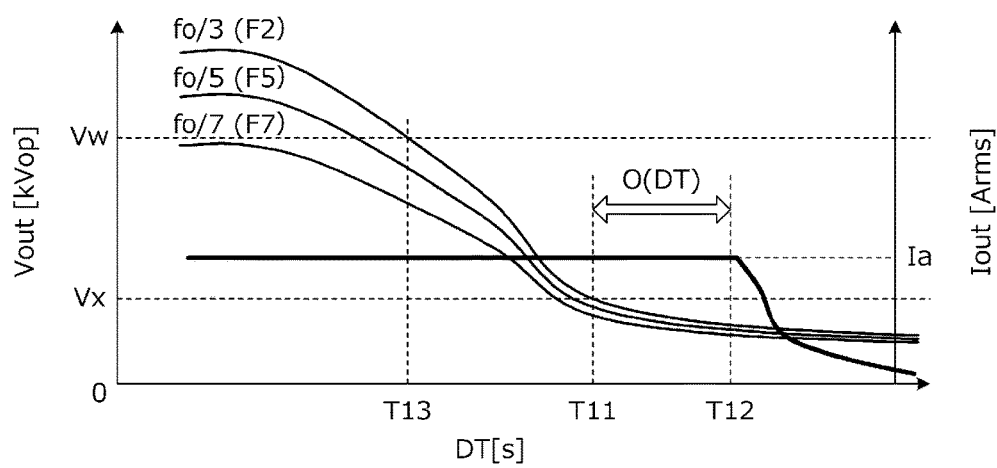
FIG. 6 is a diagram illustrating the output voltage and output current versus a dead time.

FIG. 6 is a diagram illustrating the output voltage and output current versus the dead time DT. Increasing of the dead time is equivalent to making the duty of a substantially rectangular wave be about 50% or less. The harmonic components of a substantially rectangular wave decrease in proportion to the duty. Hence, the longer the dead time DT (the smaller the duty), the lower the output voltage in a no-load state. As illustrated in FIG. 6, the longer the dead time DT, the lower the output voltage Vout for any of the driving frequencies fo/3, fo/5, and fo/7 of the inverter circuit.

On the other hand, as illustrated in FIG. 6, the value of an arc discharge current Ia is not influenced even when the dead time DT is increased to some extent. This is due to the fact that the positive and negative portions of the arc discharge current waveform exhibit symmetry even when the dead time DT is increased. This action will be described in detail later.

In the example illustrated in FIG. 6, when the dead time DT is made to be T13 or more, the output voltage Vout becomes lower than the withstand upper limit voltage Vw of the resonant circuit even when the driving frequency is about fo/3. Further, when the dead time DT is made to be T11 or more, the output voltage Vout becomes lower than the threshold Vx even when the driving frequency is about fo/3. The threshold Vx is the threshold of a voltage at which there is an effect of degradation of characteristics due to the heat generation of the switching devices Q1, Q2, Q3, and Q4 of the inverter circuit 11 and a decrease in the lifetime of the discharge lamp due to damage. When the dead time DT is T12 or less, the arc discharge current Ia flows. In other words, a predetermined arc discharge can be maintained. Hence, when the dead time DT is set in a range O(DT) longer than or equal to T11 and shorter than or equal to T12, an arc discharge can be maintained, and even when "dying out" occurs, the withstand upper limit voltage Vw of the resonant circuit is not exceeded, and the threshold Vx is not exceeded that has an effect of characteristics degradation due to the generation of heat of the switching devices Q1, Q2, Q3, and Q4 of the inverter circuit 11 and a decrease in the lifetime of the discharge lamp 10 due to damage. The threshold Vx, which also depends on the characteristics of the discharge lamp and selection of the components of the inverter circuit, can be determined on the basis of experiment, for example. The time T2 of the dead time DT illustrated in FIG. 4 has a value within a range longer than or equal to the time T11 and shorter than or equal to the time T12 in FIG. 6.

Figure 7:
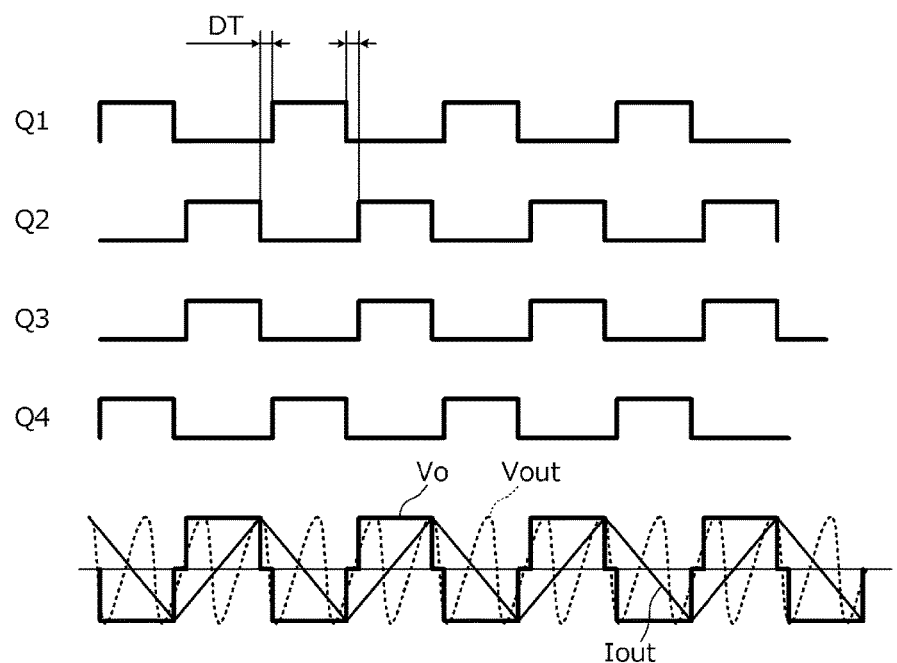
FIG. 7 illustrates waveform diagrams of respective portions of an inverter circuit and the resonant circuit when the dead time is comparatively short.
Figure 8:
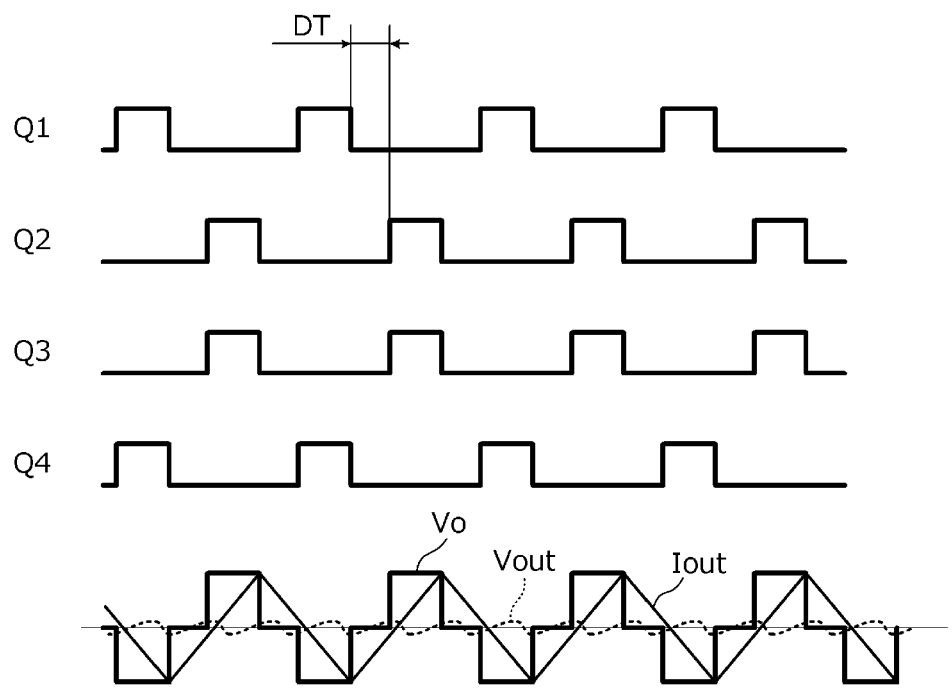
FIG. 8 illustrates waveform diagrams of respective portions of the inverter circuit and the resonant circuit when the dead time is comparatively long.
Figure 9:
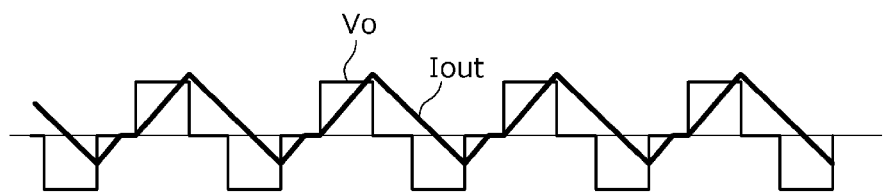
FIG. 9 illustrates waveform diagrams of respective portions of the inverter circuit and the resonant circuit when the dead time is comparatively long and the positive and negative portions of the waveform of the output current (lamp current) exhibit non-symmetry.

FIG. 7, FIG. 8, and FIG. 9 are waveform diagrams of portions of the inverter circuit 11 and the resonant circuit 14 when the dead time DT described above is changed.

In FIG. 7 and FIG. 8, the states of the switching devices Q1, Q2, Q3, and Q4 of the inverter circuit 11, an output voltage Vo of the inverter circuit 11, the output voltage Vout in a no-load state, and the arc discharge current Ia (output current in an arc discharge state) are illustrated. In FIG. 9, only the output voltage Vo and the arc discharge current Ia are illustrated.

In the example illustrated in FIG. 8, the dead time DT is longer than in the example of FIG. 7. As illustrated in FIG. 7 and FIG. 8, the output current (arc current of the lamp) Iout is not influenced even when the dead time is increased to some extent. This is due to the fact that, as illustrated in FIG. 7, in the case where the positive and negative portions of the waveform of the output current Iout exhibit symmetry, even when the dead time DT is increased to about a quarter of a single cycle, the output current Iout is not influenced by the dead time DT if the switching devices Q1 and Q4 or the switching devices Q2 and Q3 of the inverter circuit 11 are turned on before the polarity of the current flowing through the resonant inductor Lr is reversed. Hence, the arc discharge is able to be maintained even when the dead time DT is increased in a range in which the switching devices Q1 and Q4 or the switching devices Q2 and Q3 are turned on before the polarity of the current flowing through the resonant inductor Lr is reversed.

However, as illustrated in FIG. 9, when the positive and negative portions of the waveform of the output current Iout exhibit non-symmetry, (when the output current Iout is biased in the positive or negative direction), there may be a case in which the output current Iout is intermittent (periods with no currents are generated) even when the dead time DT is in a range shorter than about a quarter of the cycle time. In such a case, the predetermined arc discharge is unlikely to be maintained and is likely to "die out". Hence, it is important to set the dead time DT in a range in which the output current Iout does not become intermittent.

In this way, the optimum dead time DT exists in a range that allows an arc discharge to be continued while decreasing the output voltage in a no-load state. This optimum value, which depends on also the characteristics of the discharge lamp, can be determined on the basis of experiment, for example.

Note that the fact that the output current Iout is biased in the positive or negative direction as illustrated in FIG. 9 is equivalent to the fact that a DC component is superimposed on the current flowing through the resonant inductor Lr. When the DC component superimposed on the current flowing through the resonant inductor Lr is large, the resonant inductor Lr may be magnetically saturated. When the above-described control of the dead time DT is performed during the second period S2 in which an arc discharge current flows, as in the present preferred embodiment, increasing the dead time DT has an effect of preventing generation of magnetic saturation. In other words, magnetic saturation of the resonant inductor Lr is also prevented by setting the dead time DT.

Second Preferred Embodiment

Figure 10:
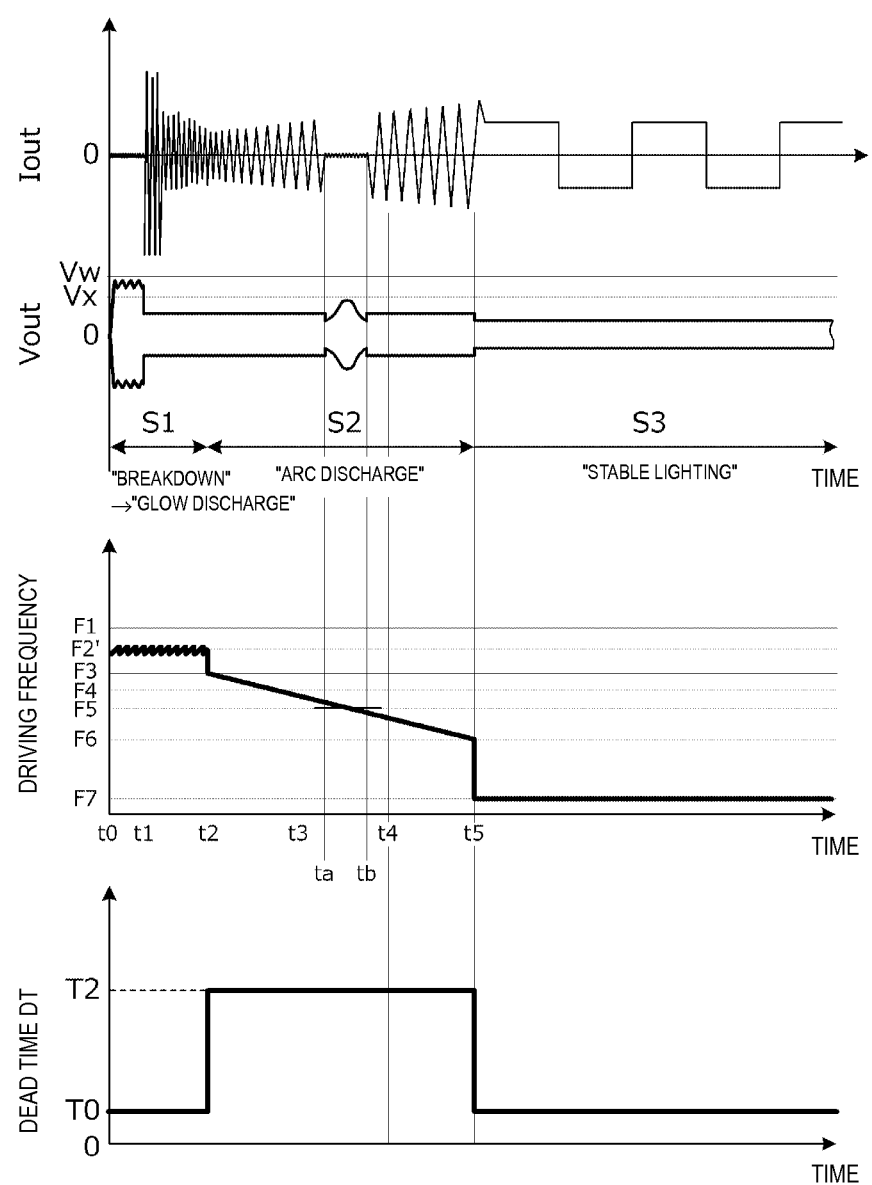
FIG. 10 illustrates waveform diagrams of respective portions of a discharge lamp lighting apparatus according to a second preferred embodiment of the present invention.
Figure 11:
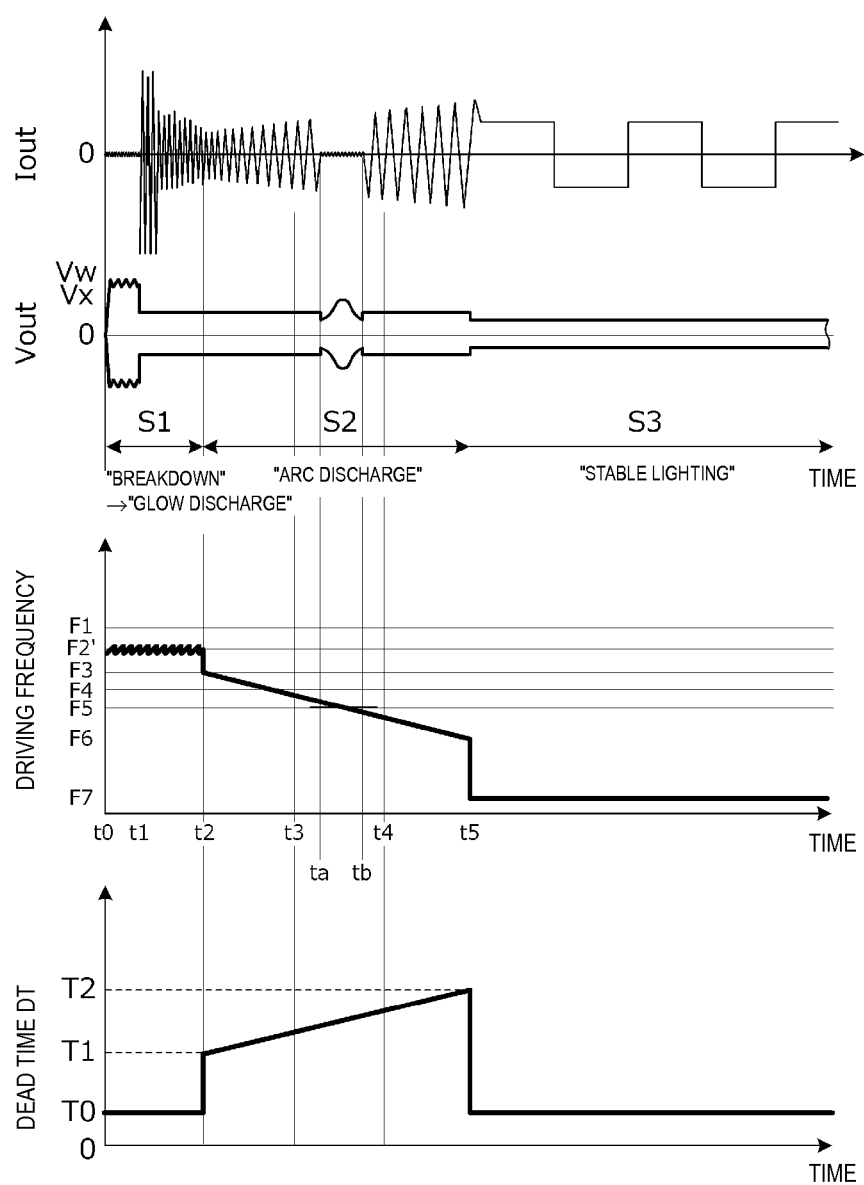
FIG. 11 illustrates waveform diagrams of respective portions of another discharge lamp lighting apparatus according to the second preferred embodiment of the present invention.

FIG. 10 and FIG. 11 are waveform diagrams of portions of a discharge lamp lighting apparatus according to a second preferred embodiment of the present invention. The circuit of the discharge lamp lighting apparatus is preferably the same as the circuit illustrated in FIG. 1 of the first preferred embodiment. The present preferred embodiment is different from the example illustrated in FIG. 4 in the first preferred embodiment in terms of the driving frequency control in the second period S2. In both of FIG. 10 and FIG. 11, the driving frequency of the inverter circuit is gradually decreased from F3 to F6 over the whole second period S2 extending from time t2 to time t5. In this way, the driving frequency may be continuously decreased. This continuous sweeping of the driving frequency is an example of the "control for gradually decreasing a driving frequency".

Similarly to the first preferred embodiment, also in the present preferred embodiment, during the second period S2 in FIG. 10 and FIG. 11, an excessive voltage is not applied to the resonant capacitor and the discharge lamp even when "dying out" occurs during a period ta to tb, during which the driving frequency becomes near F5 (fo/5).

In the example illustrated in FIG. 11, the dead time DT is gradually increased from T1 to T2 over the whole range of the second period S2 extending from time t2 to time t5. In this way, the dead time DT may be controlled so as to be gradually increased in accordance with a decrease in the driving frequency during the second period S2. As a result, since the dead time is set so as to be rather short to an extent that the lamp current Iout does not become intermittent, in a region in which the driving frequency of the inverter circuit is high, it is easy to secure a necessary arc current. Hence, "dying out" immediately after transition from the first period to the second period is prevented from occurring. Since the resonant voltage of the resonant circuit is maintained low over a wide range of the driving frequency, it becomes easy to significantly reduce or prevent the phenomenon of the resonant inductor being saturated while limiting the overvoltage at a no-load time, even when the arc current is biased in the positive or negative direction.

Third Preferred Embodiment

In the first and second preferred embodiments, by minutely varying the driving frequency of the inverter circuit 11 in a predetermined frequency range with F2' as the center thereof during the first period S1, a high voltage is applied, thus causing breakdown to be generated and a glow discharge to be started. After a time period required for transition to an arc discharge through the glow discharge has passed, transition to the second period S2 is made to take place. In other words, the processing during the second period S2 is performed assuming that an arc discharge has been started at the time when the processing for the first period S1 has been finished. On the other hand, in a third preferred embodiment of the present invention, transition from the first period S1 to the second period S2 is caused to occur on the basis of the detection result for a lamp current.

The circuit configuration of the lamp lighting apparatus is preferably the same as that illustrated in FIG. 1. The switching control circuit 24 receives a voltage signal corresponding to the value of the lamp current detected by the current detection circuit 25 and detects transition from a glow discharge to an arc discharge in accordance with a change in the magnitude of the lamp current and the class of the magnitude of the lamp current in a steady state.

Usually, the lamp current is sharply increased due to breakdown, and the lamp current is unstable in a glow discharge state. However, after that, when transition to an arc discharge occurs, the lamp current is stabilized. By detecting this stabilization of the lamp current, transition from a glow discharge state to an arc discharge state is detected.

Therefore, the duration of the first period S1 described above need not be made to be constant, and processing for the second period S2 can be immediately performed upon detection of the transition to an arc discharge on the basis the lamp current.

The descriptions of the above preferred embodiments are examples in all the respects and are not restrictive. Modifications, combinations and/or changes can appropriately be made by those skilled in the art. The scope of the present invention is shown by the following claims and not by the preferred embodiments described above. Further, it is intended that the scope of the present invention includes all the modifications having equivalent meaning and within the scope of the claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A discharge lamp lighting apparatus comprising:
an inverter circuit that includes a high-side switching device and a low-side switching device and that generates an AC voltage supplied to a discharge lamp;
an inverter control circuit that performs driving control of the inverter circuit; and
a resonant circuit that includes a resonant inductor and a resonant capacitor, that is provided in a stage subsequent to the inverter circuit, and that increases, at a start-up time of the discharge lamp, a supply voltage supplied to the discharge lamp through a voltage step-up action accompanying a resonance phenomenon; wherein
the inverter control circuit includes:
a driving frequency control circuit that drives the inverter circuit by using a first frequency including a resonant frequency of the resonant circuit during a first period which is a period in which breakdown and a glow discharge subsequent to initiation of a start-up process of the discharge lamp are generated, that drives the inverter circuit by using a second frequency including a resonant frequency of the resonant circuit, the second frequency being lower than the first frequency, during a second period which is a period in which an arc discharge of the discharge lamp is generated, and that drives the inverter circuit by using a third frequency lower than the second frequency, during a third period subsequent to the second period; and
a dead time control circuit that sets a dead time in which both of the high-side switching device and the low-side switching device of the inverter circuit are turned off so that the dead time is longer in the second period than in the first period and the third period.

2. The discharge lamp lighting apparatus according to claim 1, wherein
the driving frequency control circuit gradually decreases a driving frequency of the inverter circuit from a start of the second period; and
the dead time control circuit increases the dead time in accordance with a decrease in the driving frequency in the second period.

3. The discharge lamp lighting apparatus according to claim 1, wherein
the inverter control circuit includes a detector that detects a start of the arc discharge of the discharge lamp; and
the driving frequency control circuit performs control of the first period until the start of the arc discharge is detected and switches to control of the second period after the arc discharge has been detected.

4. The discharge lamp lighting apparatus according to claim 1, wherein the high-side switching device includes at least two switches and the low-side switching device includes at least two switches.

5. The discharge lamp lighting apparatus according to claim 1, wherein the resonant circuit is a series resonant circuit.

6. The discharge lamp lighting apparatus according to claim 1, further comprising a converter circuit that converts an input DC voltage into a predetermined voltage that is supplied to the inverter control circuit.

7. The discharge lamp lighting apparatus according to claim 6, wherein the converter circuit is a step-down chopper non-insulating converter circuit.

8. The discharge lamp lighting apparatus according to claim 6, wherein the converter circuit includes a switching device, a diode, an inductor and a capacitor.

9. The discharge lamp lighting apparatus according to claim 6, wherein the converter circuit includes an output voltage/current detection circuit and resistors.

10. The discharge lamp lighting apparatus according to claim 1, wherein the inverter control circuit includes a digital signal processor.

11. The discharge lamp lighting apparatus according to claim 1, wherein the inverter circuit includes a driver circuit including a high-side driving circuit and a low-side driving circuit.

12. The discharge lamp lighting apparatus according to claim 1, further comprising a current detection circuit that detects a lamp current of the discharge lamp, wherein the inverter control circuit performs driving control of the inverter circuit based on the lamp current detected by the current detection circuit.

13. A projector comprising:
   a discharge lamp; and
   the discharge lamp lighting apparatus according to claim 1.

* * * * *